United States Patent Office 3,114,755
Patented Dec. 17, 1963

3,114,755
PROCESS FOR PREPARING BIS-(MONOSUBSTITUTEDAMINO)-BENZOQUINONES AND MONO-SUBSTITUTEDAMINO-NAPHTHOQUINONES
Rupert A. Covey, Wolcott, Conn., assignor to United States Rubber Company, New York, N.Y., a corporation of New Jersey
No Drawing. Filed Mar. 10, 1961, Ser. No. 94,694
14 Claims. (Cl. 260—396)

This invention relates to a process for preparing monosubstituted aminoquinones, and more particularly it relates to an improved process for preparing 2,5-bis-(monosubstitutedamino) - 1,4 - benzoquinones and 2-(monosubstitutedamino) - 1,4 - naphthoquinones of the formulas

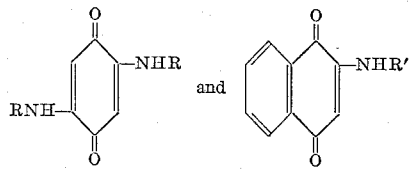

and where R may be an alkyl other than methyl, alkenyl, cycloalkyl or aralkyl radical, and R' may be methyl or may be the same as R, by reacting the quinone with a primary amine in the presence of oxygen and a copper salt which forms a soluble complex with the primary amine.

Baltzly and Lorz [J. Am. Chem. Soc. 70, 861 (1948)] have described the preparation of bis(dialkylamino)-benzoquinones by reacting 1,4-benzoquinone with secondary amines. Unfortunately, the method was not applied successfully with primary amines and these authors state the method was unsuccessful with methylamine, aniline and ammonia. I have now discovered, as will be described in more detail herein, a method by which primary amines may be used successfully, provided that the starting primary amine is selected from a certain class, and provided that oxygen and copper are used in a manner to be described.

Crosby and Lutz [J. Am. Chem. Soc. 78, 1233 (1956)] using Baltzly and Lorz's procedure prepared several bis-(dialkylamino)benzoquinones. They also extended this procedure to the use of a secondary amine (piperidine) with 1,4-naphthoquinone. These authors indicate lack of success with primary amines. On the contrary, the present invention discloses to the art a highly successful and advantageous process involving the use of primary amines, in a manner to be described herein.

Harger [J. Am. Chem. Soc., 46, 2540 (1924)] prepared a series of 2,5-bis(monoalkylamino)-1,4-benzoquinones by reacting hydroquinone with an excess of a primary amine in the presence of oxygen. Unfortunately, the reaction time was several days and the yields were frequently poor.

The chemicals prepared in accordance with the present invention are useful as herbicides and for other purposes, for example as intermediates for the synthesis of other chemicals.

In carrying out the invention I usually react the starting quinone with at least an equimolar quantity of the primary amine for each amino group I want to add to the quinone. Generally, I prefer to use an excess of the primary amine, say at least 2 to 10 or even more molar equivalents of the primary amine for each amino substituent, and more preferably 2 to 6 molar equivalents of the primary amine. Thus, for each mole of naphthoquinone I use preferably 2 to 10 moles of primary amine and more preferably 2 to 6 moles. For each mole of benzoquinone I use preferably 4 to 20 moles of primary amine and more preferably 4 to 12 moles. The excess primary amine can serve as a solvent medium for the reaction, or I may use any other suitable solvent such as an alcohol, if desired. Usually I first form the required copper-primary amine complex between the primary amine and a suitable copper salt, and then combine the portion containing this complex with the quinone. I generally employ the copper salt in molar quantity about equal to the molar quantity of the starting quinone, but this is not critical and other amounts may be used. When the described materials are mixed together and oxygen (or an oxygen-containing gas such as air) is bubbled in, the reaction proceeds readily. The reaction ordinarily advances to a sufficient extent to provide a satisfactory yield of the desired product within an hour or two (generally within a period of from about 0.25 hour to 4 hours) after which the product may be isolated by conventional methods. In some instances, for example in making some benzoquinones, the reaction mixture becomes thick with an insoluble brown solid copper complex of the product. This complex can be broken by addition of an acid, whereupon the aminoquinone precipitates.

It will be understood that when the starting material is 1,4-benzoquinone, the primary amine used may be represented by the formula $RNH_2$ wherein R is an alkyl other than methyl, alkenyl, cycloalkyl, or aralkyl radical. Thus methylamine is an anomalous case, and is not operative in the invention when 1,4-benzoquinone is employed. However, primary alkyl amines other than methylamine, such as alkyl amines in which the alkyl group has from 2 to 12 carbon atoms, perform satisfactorily in the procedure of the invention, using 1,4-benzoquinone. Particularly preferred are lower alkyl groups containing from 2 to 8 carbon atoms. Examples of suitable primary amines for reaction with 1,4-benzoquinone, wherein R is alkenyl include allyl amine, methallyl amine, and 5-amino-1-hexene. Suitable primary amines wherein R is cycloalkyl include cyclohexylamine, 2-methylcyclohexylamine, and cyclopentylamine. Suitable primary amines wherein R is aralkyl include benzylamine, 2-phenethylamine and 4-chloro-2-phenethylamine. In general, it may be stated that the radical R invariably contains at least 2 carbon atoms, and almost invariably from 2 to 12 carbon atoms.

It will further be understood that when the starting quinone is 1,4-naphthoquinone, the primary amine employed will have the formula $R'NH_2$, wherein R' is defined and exemplified in the same manner as R, above, with the exception that R' may additionally be methyl, that is, methylamine is operative with 1,4-naphthoquinone in the process of the invention, in contrast to the anomalous behaviour of methylamine with 1,4-benzoquinone.

The copper salts suitable for use in the invention are, as indicated, those which form a soluble copper-amine complex (i.e., soluble in any solvent, such as an alcohol, an excess of the amine used in the reaction, or a tertiary amine). Among the copper salts suitable for use with various amines may be mentioned cupric acetate, cupric sulfate, cupric chloride, cupric nitrate, cupric bromide and cupric benzoate. However, it will be understood that the invention is not limited to the use of the particular copper salts named, and numerous other copper salts may be substituted for those mentioned. Although I prefer to employ 1 molar equivalent of copper salt for each mole of the quinone, I may use smaller amounts such as 0.1 mole or even less, with some loss in yield. Indeed, I may also use larger amounts such as 3 or 4 or even more molar equivalents.

As indicated, an important feature of the invention resides in contacting the reaction mixture with oxygen during the process. This is most conveniently accomplished by bubbling a gas containing a substantial proportion of oxygen through the reaction mixture, but any suitable device for effecting liquid-gas contact may be employed for this purpose.

Before setting forth specific working examples of the invention, it is desired to outline in some detail a preferred practice of the invention, first as applied to the preparation of the described aminonaphthoquinones, and then as applied to the preparation of the described aminobenzoquinones:

A. GENERAL PROCEDURE FOR PREPARATION OF AMINONAPHTHOQUINONES

In general, a preferred procedure for a 0.1 mole run can be described as follows: A suitable copper salt (0.01 to 0.1 or more moles) is suspended in 100 to 200 ml. of an alcohol and 0.1 to 0.4 mole of the amine is added. Thus, a copper-amine complex is formed which is soluble in the alcohol.

Instead of using an alcohol, e.g., an alkanol having 1–4 carbon atoms such as methanol or isopropyl alcohol, an excess of the primary amine can be used as a solvent (100 to 200 ml. for a 0.1 mole run). Other solvents such as tributylamine can also be used.

If an alcoholic solution is used, a suspension of 0.1 mole 1,4-naphthoquinone in 100 to 200 ml. of the alcohol is added to it preferably in one portion. If the amine is used as a solvent, the naphthoquinone powder is added preferably portion-wise.

The mixture is stirred while oxygen or air is bubbled in. There is a spontaneous warming of the reaction mixture. After 0.25 to 2.0 hours, the exothermicity has subsided and, if the product has precipitated, the mixture is filtered. If no precipitate is present the mixture is cooled to −20° or below and filtered. If there is still no solid reaction product the mixture is evaporated under an air jet until a precipitate forms. The precipitated material in most cases is fairly pure, but occasionally is contaminated with copper salts or a copperamine complex. In this case, the product can be extracted into ether and the hydrochloride of the aminoquinone is formed by bubbling anhydrous hydrogen chloride into the ether solution. The hydrochloride is isolated by filtration and can be converted to the free aminoquinone simply by stirring with ice-cold water.

Occasionally, an isooctane extraction may be preferred over the ether extraction as a means of purifying the product.

The following conditions are preferred:

1 molecular equivalent of 1,4-naphthoquinone.
1 molecular equivalent of copper salt.
3 molecular equivalents of amine.
2000 ml. alcohol (preferably methanol) per mole of naphthoquinone.
Oxygen rather than air.

B. MODIFICATIONS IN ABOVE PROCEDURE FOR PREPARATION OF AMINOBENZOQUINONES

Essentially the same procedure is used as in A above, preferably with the following modifications:

Benzoquinone (0.1 mole) is dissolved in the alcohol and this solution is added in one portion to an alcoholic solution of 0.2 to 0.8 or more mole of the amine and 0.01 to 0.1 or more mole of the copper salt. The mixture becomes thick with a finely divided brown solid. Oxygen is bubbled in until the exotherm subsides. Concentrated hydrochloric acid is added, the product is filtered and recrystallized from alcohol.

The following examples will serve to illustrate the practice of the invention in more detail.

*Example I.—Preparation of 2-Methylamino-1,4-Naphthoquinone*

Cupric acetate monohydrate (20 g., 0.1 mole) was added to a solution of 6 g. (0.2 mole) methylamine in 200 ml. methanol. To this solution was added a suspension of 15.8 g. (0.1 mole) 1,4-naphthoquinone in 200 ml. methanol. The mixture was stirred while oxygen was bubbled in for 1.5 hrs. Bright red crystals formed; the mixture was cooled, filtered, and the product dried; M.P. 229–232°; yield, 14.5 g. (78%). (Literature M.P. 234°).

The process for the preparation of this compound and the 2-ethylaminonaphthoquinone (Example II) demonstrate the superiority in both yield and ease of preparation over the procedure of Plimpton J. Chem. Soc. 37, 633 (1880).

*Example II.—Preparation of 2-Ethylamino-1,4-Naphthoquinone*

Cupric acetate monohydrate (20 g., 0.1 mole) was added to a solution of 13.5 g. (0.3 mole) ethylamine in 200 ml. methanol. To the resulting solution was added in one portion a suspension of 15.8 g. (0.1 mole) 1,4-naphthoquinone in 200 ml. methanol. Oxygen was bubbled into the reaction mixture while stirring for one hour, during which time crystals formed on the sides of the flask. The mixture was cooled to 0°, filtered, and the reddish-yellow crystals washed with cold methanol. The dried product weighed 15.8 g. (79%), M.P. 140–141°. (Literature M.P. 138–140°.) Recrystallization of the product from methanol did not change the melting-point.

*Example III.—Preparation of 2-n-Propylamino-1,4-Naphthoquinone*

Cupric acetate monohydrate (2000 g., 10 moles) was added to 2 gal. methanol in a 5-gal. reactor. The mixture was cooled to 6° and 1770 g. (30 moles) n-propylamine was added in small portions. Only a slight exotherm was observed. A suspension of 1660 g. (10 moles) 5% wet 1,4-naphthoquinone in one gallon methanol was added. Further spontaneous warming was noticed. Oxygen was bubbled into the reaction mixture for 1.75 hrs., and the temperature rose to 17°. The mixture was cooled to −15° and the temperature held between −15 and −5° for 30 min. The mixture was filtered and washed three times with Dry Ice-cooled methanol. Dried, M.P. 116–117°. The product was treated with hot water to remove small amounts of residual cupric acetate, filtered and dried, M.P. 116–117°, yield, 1871 g. (87%).

*Analysis.*—Calcd. for $C_{13}H_{13}O_2N$: N, 6.51. Found: N, 6.42, 6.41.

This procedure demonstrates a process development run.

*Example IV.—Preparation of 2-n-Propylamino-1,4-Naphthoquinone*

Cupric acetate monohydrate (10 g., 0.05 mole) was dissolved in 100 ml. n-propylamine. The solution was cooled slightly and 7.9 g. 1,4-naphthoquinone was added. The reaction was exothermic. The mixture was cooled again while oxygen was bubbled in. After 15 min. the exothermicity had subsided and the introduction of oxygen was continued for 45 min. more. An additional 7.9 g. (total, 15.8 g., 0.1 mole), 1,4-naphthoquinone was added and the oxygen influx was continued for another half hour. The reaction mixture was cooled in acetone-Dry Ice, filtered, washed with cold methanol, and dried, wt. 11.1 g. (52%), M.P. 114–116°.

This demonstrates the use of the amine as a solvent.

*Example V.—Preparation of 2-Isopropylamino-1,4-Naphthoquinone*

Isopropyl alcohol (200 ml.) was added gradually to 20 g. (0.1 mole) cupric acetate monohydrate while stirring. Isopropylamine (17 ml., 11.8 g., 0.2 mole) was added to the suspension. A suspension of 21 g. (0.1 mole) 30% wet 1,4-naphthoquinone in 200 ml. isopropyl alcohol was added and the mixture was stirred while oxygen was bubbled in for one hour. The mixture was filtered and 2 g. of copper salts was obtained. The filtrate was evaporated to about one-half of its original volume and was poured into ice-cold water with stirring. A solid separated and was filtered. The dried solid was extracted with ether and the ether extracts evaporated yielding 12.8 g. (60%) of product, M.P. 84–87°. Recrystallization of a sample from isopropyl alcohol gave orange crystals, M.P. 89–89.5°.

*Analysis.*—Calcd. for $C_{13}H_{13}O_2N$: N, 6.51. Found: N, 6.30.

This experiment shows that isopropyl alcohol can be used in place of methanol.

*Example VI.—Preparation of 2-Isopropylamino-1,4-Naphthoquinone*

This reaction was run in the same way as the preceding one (Ex. V) except that methanol was used in place of isopropyl alcohol. Filtration of the reaction mixture yielded 3.9 g. of copper salts. The methanol solution was evaporated nearly to dryness. The crude product was taken up in ether and the hydrochloride of the product was precipitated by adding hydrogen chloride gas. Wt. of hydrochloride, 18.1 g. (72%). This material was converted to the free base by adding it gradually to ice-cold water with stirring.

*Example VII.—Preparation of 2-n-Butylamino-1,4-Naphthoquinone*

A suspension of 41 g. (0.2 mole) 30% wet 1,4-naphthoquinone in 500 ml. methanol was added in one portion to a solution of 40 g. (0.2 mole) cupric acetate monohydrate and 29.2 g. (0.4 mole) n-butylamine in 500 ml. methanol. Oxygen was bubbled into the reaction mixture for two hours. The mixture was cooled and filtered giving 25 g. (55%) of bright orange crystals, M.P. 124–125°.

*Analysis.*—Calcd. for $C_{14}H_{15}O_2N$: N, 6.11. Found: N, 5.63, 5.92.

*Example VIII.—Preparation of 2-Sec.-Butylamino-1,4-Naphthoquinone*

Sec. butylamine (30.3 ml., 21.9 g., 0.3 mole) was added to a suspension of 25.0 g. (0.1 mole) cupric sulfate pentahydrate in 200 ml. methanol. To this solution was added a suspension of 15.8 g. (0.1 mole) 1,4-naphthoquinone in 200 ml. methanol. Oxygen was bubbled in for about one hour while stirring the mixture. Filtration of the reaction mixture gave 11.0 g. copper salts. The filtrate was evaporated to a dark-red oil which was taken up in ether. The ether-insoluble material was copper salts, wt. 17.8 g. The ether solution was evaporated to dryness and the residue extracted three times with hot isooctane. Cooling of the isooctane precipitated 8.9 g. reddish-orange crystals, M.P. 61–62°. A second crop of 3.1 g. was obtained. Total yield 12.0 g. (52%).

*Example IX.—Preparation of 2-Sec.-Butylamino-1,4-Naphthoquinone*

Cupric acetate monohydrate (100 g., 0.5 mole) was added to a solution of 109.5 g. (1.5 mole) sec.-butylamine in 1000 ml. methanol. This solution was added to a suspension of 79 g. (0.5 mole) 1,4-naphthoquinone in 500 ml. methanol. Oxygen was bubbled in for two hours, the reaction temperature reaching a maximum of 38°. The mixture was filtered and the filtrate evaporated nearly to dryness. The resulting oily material was extracted several times with boiling isooctane. The extracts were cooled yielding 31 g. of product. Concentration of the filtrates gave an additional 5 g. of crystals. Total yield 36 g. (32%), M.P. 62–64°. A sample recrystallized again melts 63–64°.

*Analysis.*—Calcd. for $C_{14}H_{15}O_2N$: N, 6.11. Found: N, 6.25.

*Example X.—Preparation of 2-Isobutylamino-1,4-Naphthoquinone*

Isobutylamine (29.2 g., 0.4 mole) was added to a suspension of 40 g. (0.2 mole) cupric acetate monohydrate in 400 ml. methanol. The solution thus formed was added in one portion to 31.6 g. (0.2 mole) 1,4-naphthoquinone in 400 ml. methanol. Oxygen was bubbled into the reaction mixture for a half hour. The mixture was allowed to stand for 1.5 hrs. and was then filtered, giving bright orange crystals. Upon cooling the filtrate to −30° a second crop was obtained. These were combined and recrystallized from methanol, M.P. 123–124°, yield 21 g. (46%).

*Analysis.*—Calcd. for $C_{14}H_{15}O_2N$: N, 6.11. Found: N, 6.02, 6.04.

*Example XI.—Preparation of 2-Tert.-Butylamino-1,4-Naphthoquinone*

Cupric acetate monohydrate (40 g., 0.2 mole) was added to a solution of 29.2 g. (0.4 mole) t-butylamine in 200 ml. methanol. To this solution was added a suspension of 31.6 g. (0.2 mole), 1,4-naphthoquinone in 200 ml. methanol. Oxygen was bubbled into the reaction mixture for 1.5 hrs. The mixture was filtered and the filtrate evaporated to dryness. The oily residue was extracted with ether and the extracts combined. Hydrogen chloride gas was bubbled into the ethereal solution and the hydrochloride of the product was filtered off. The hydrochloride was converted to the free base by adding it slowly to cold water, while stirring. The free base was filtered and dried, wt. 10 g. (22%), M.P. 86–87°.

*Analysis.*—Calcd. for $C_{14}H_{15}O_2N$: N, 6.11. Found: N, 5.68.

*Example XII.—Preparation of 2-(2-Ethylhexylamino)-1,4-Naphthoquinone*

2-ethylhexylamine (38.7 g., 0.3 mole) was added to a suspension of 20 g. (0.1 mole) cupric acetate monohydrate in 200 ml. methanol. To the resulting solution was added 15.8 g. (0.1 mole) 1,4-naphthopinone in 200 ml. methanol. Oxygen was bubbled in for about 2 hrs., during which time spontaneous warming was observed. Toward the end of this time the reaction mixture became cool and was evaporated to one-half of its original volume. A flocculent orange precipitate appeared and was filtered off. It was washed with water and then with 1:1 water-methanol solution. The solid was dried and dissolved in ether. Considerable flocculent light-green solid was insoluble in the ether. The ether solution was filtered and hydrogen chloride gas was added to the filtrate, giving 10.6 g. of bright orange solid. This was added to ice-cold water to convert it back to the free base. The solid was filtered and dried, wt. 7.4 g. It was again taken up in ether and the ether solution filtered from additional amounts of green solid. The filtrate was evaporated to dryness and the product recrystallized from hexane, wt. 5.9 g. (21%), M.P. 59–60.5°.

*Analysis.*—Calcd. for $C_{18}H_{23}O_2N$: N, 4.91. Found: N, 4.86, 4.85.

*Example XIII.—Preparation of 2-Allylamino-1,4-Naphthoquinone*

Cupric nitrate trihydrate (24.2 g., 0.1 mole) was dissolved in 200 ml. methanol and 30 ml. (0.4 mole) allylamine was added. To this solution was added a suspension of 15.8 g. (0.1 mole) 1,4-naphthoquinone in 200 ml. methanol. The mixture was stirred while oxygen was bubbled in for one hour. The reaction mixture was filtered and the filtrate cooled in Dry Ice-acetone. The product was filtered, washed with cold methanol, and dried, yield 16.2 g. (76%), M.P. 117–118°.

*Example XIV.—Preparation of 2-Allylamino-1,4-Naphthoquinone*

Allylamine (22.5 ml., 17.1 g., 0.3 mole) was added to 20 g. (0.1 mole) cupric acetate monohydrate in 200 ml. methanol. To the solution thus formed was added a suspension of 15.8 g. (0.1 mole) 1,4-naphthoquinone in 200 ml. methanol. Oxygen was bubbled into the reaction mixture for 1.5 hrs. during which time spontaneous warming was observed. The mixture was cooled in Dry Ice-acetone and filtered. The orange crystals were washed twice with cold methanol and dried, M.P. 117–118°, yield 17.4 g. (82%).

*Analysis.*—Calcd. for $C_{13}H_{11}O_2N$: N, 6.57. Found: N, 6.50, 6.52.

This experiment demonstrates the use of alkenylamines.

*Example XV.—Preparation of 2,5-Bis(Ethylamino)-1,4-Benzoquinone*

Ethylamine gas (27.0 g., 0.6 mole) was bubbled into 100 ml. methanol and the solution was added to a suspension of 20 g. (0.1 mole) cupric acetate monohydrate in 100 ml. methanol. To the copper-amine complex thus formed was added a solution of 10.8 g. (0.1 mole) benzoquinone in 200 ml. methanol. A brown precipitate was formed. Oxygen was bubbled into the reaction mixture until no further warming was observed. Concentrated hydrochloric acid was added until the mixture was strongly acidic, whereupon a red precipitate formed. The mixture was filtered and the solid washed with water and dried giving 13.7 g. (71%) of red crystals, M.P. 208–212°. (Literature M.P.=211–212°.)

*Example XVI.—Preparation of 2,5-Bis(n-Propylamino)-1,4-Benzoquinone* n-Propylamine (49.3 ml., 35.4 g., 0.6 mole) was added to a suspension of 20 g. (0.1 mole) cupric acetate monohydrate in 200 ml. methanol. To the solution thus formed was added a solution of 10.8 g. (0.1 mole) benzoquinone in 200 ml. methanol. A brown precipitate formed. Oxygen was bubbled into the mixture until spontaneous warming ceased (about 1.5 hours). Concentrated hydrochloric acid was added slowly with cooling until a dark-red solution was formed (about 60 ml.). After cooling for a few minutes dark-red crystals formed and the mixture was filtered. Yield 14.1 g. (64%), M.P. 160–163°. After recrystallization from ethanol the product melted 163–164°.

*Analysis.*—Calcd. for $C_{12}H_{18}O_2N_2$: N, 12.60. Found: N, 12.29.

*Example XVII.—Preparation of 2,5-Bis(Sec.-Butylamino)-1,4-Benzoquinone*

A procedure similar to Example XVI was used. The crude product was recrystallized several times from ethanol yielding 12.1 g. (48%) dark-red crystals, M.P. 155–157°. (Literature melting-point is 160°.)

Having thus described my invention, what I claim and desire to protect by Letters Patent is:

1. A process for preparing monosubstitutedaminoquinones having a formula selected from the group consisting of

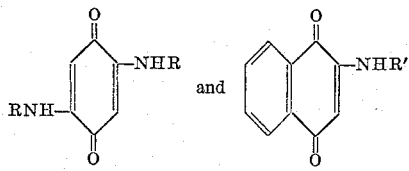

where R is a monovalent hydrocarbon radical having from 2 to 12 carbon atoms selected from the group consisting of alkyl, alkenyl, cycloalkyl and aralkyl radicals and R' is a monovalent hydrocarbon radical selected from the group consisting of methyl and R as previously defined, comprising mixing 1 mole of a material selected from the group consisting of 1,4-benzoquinone and 1,4-naphthoquinone with a soluble complex of a copper salt and a primary amine having a formula selected from the group consisting of $RNH_2$ and $R'NH_2$, wherein R and R' are as defined above, the amount of said copper salt being from 0.1 to 4 moles and the amount of said primary amine being from 1 to 10 moles for each amino group on the monosubstitutedaminoquinone of the said formula, while bubbling oxygen through the resulting mixture for a period of from 0.25 hour to 4 hours, and thereafter separating the resulting monosubstitutedaminoquinone of the said formula from the reaction mixture, the said amine being $RNH_2$ when the starting quinone material is 1,4-benzoquinone whereby the product having the formula

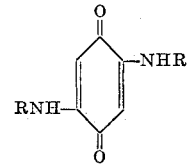

is formed, and the said amine being $R'NH_2$ when the starting quinone material is 1,4-naphthoquinone, whereby the product of the formula

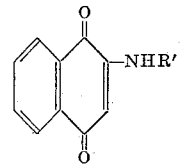

is formed, R and R' being as previously defined.

2. A process as in claim 1 in which the said primary amine serves as a solvent medium for the mixture.

3. A process as in claim 1 in which the mixture contains an alcohol as a solvent.

4. A process for preparing monosubstitutedaminonaphthoquinones having the formula

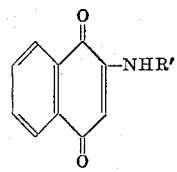

where R' is a monovalent hydrocarbon radical having from 1 to 12 carbon atoms selected from the group consisting of alkyl, alkenyl, cycloalkyl and aralkyl radicals, comprising mixing in a solvent medium 1 mole of 1,4-naphthoquinone with a soluble complex of a copper salt and a primary amine having the formula $R'NH_2$, wherein R' is as defined above, the amount of said copper salt being from 1 to 3 moles and the amount of said primary amine being from 2 10 moles, while bubbling oxygen through the resulting mixture for a period of from 0.25 hour to 4 hours, and thereafter separating the resulting monosubstitutedaminonaphthoquinone of the said structure from the reaction mixture, the said solvent being selected from the group consisting of the said amine, alcohol, and tributylamine.

5. A process for preparing monosubstitutedaminonaphthoquinones having the formula

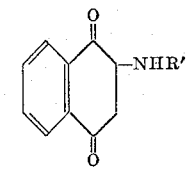

where R' is an alkyl radical having from 2 to 8 carbon atoms, comprising mixing in a solvent medium 1 mole of 1,4-naphthoquinone with a soluble complex of a copper salt and a primary amine having the formula $R'NH_2$, wherein R' is as defined above, the amount of said copper salt being from 1 to 3 moles and the amount of said primary amine being from 2 to 10 moles, while bubbling oxygen through the resulting mixture for a period of from 0.25 to 4 hours, and thereafter separating the resulting monosubstitutedaminonaphthoquinone of the said formula from the reaction mixture, the said solvent being selected from the group consisting of the said amine, alcohol, and tributylamine.

6. A process as claim 5 in which the said monosubstitutedaminonaphthoquinone is 2-n-propylamino-1,4-naphthoquinone and the said primary amine is n-propylamine.

7. A process as in claim 5 in which the said monosubstitutedaminonaphthoquinone is 2-isopropylamino-1,4-naphthoquinone and the said primary amine is isopropylamine.

8. A process as in claim 5 in which the said monosubstitutedaminonaphthoquinone is 2-sec.-butylamino-1,4-naphthoquinone and the said primary amine is sec.-butylamine.

9. A process as in claim 5 in which the said monosubstitutedaminonaphthoquinone is 2-ethylamino-1,4-naphthoquinone and the said primary amine is ethylamine.

10. A process as in claim 5 in which the said monosubstitutedaminonaphthoquinone is 2-t-butylamino-1,4-naphthoquinone and the said primary amine is t-butylamine.

11. A process for preparing monosubstitutedaminobenzoquinones having the formula

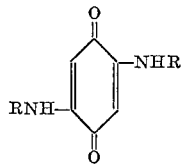

where R is a monovalent hydrocarbon radical having from 2 to 12 carbon atoms selected from the group consisting of alkyl, alkenyl, cycloalkyl, and aralkyl radicals, comprising mixing in a solvent medium 1 mole of 1,4-benzoquinone with a soluble complex of a copper salt and a primary amine of the formula $RNH_2$, wherein R is as defined above, the amount of said copper salt being from 1 to 3 moles and the amount of said primary amine being from 4 to 20 moles, while bubbling oxygen through the resulting mixture for a period of from 0.25 hour to 4 hours, and thereafter separating the resulting monosubstitutedaminobenzoquinone of the said formula from the reaction mixture, the said solvent being selected from the group consisting of the said amine, alcohol, and tributylamine.

12. A process as in claim 11 in which the said monosubstitutedaminobenzoquinone is 2,5-bis-(ethylamino)-1,4-benzoquinone and the said primary amine is ethylamine.

13. A process as in claim 11 in which the said monosubstitutedaminobenzoquinone is 2,5-bis-(n-propylamino)-1,4-benzoquinone and the said primary amine is n-propylamine.

14. A process as in claim 11 in which the said monosubstitutedaminobenzoquinone is 2,5-bis-(sec.-butylamino)-benzoquinone and the said primary amine is sec.-butylamine.

References Cited in the file of this patent

UNITED STATES PATENTS 2,701,247    Cavallito _____ Feb. 1, 1955
3,037,015    Rudy et al. _____ May 29, 1962

OTHER REFERENCES

Baltzly et al.: JACS, vol. 70, pages 861–2 (1948).
Crosby et al.: JACS, vol. 78, pages 1233–5 (1956).